Feb. 2, 1954

R. E. MEYNIG 2,667,890

HIGH AND LOW PRESSURE CUTOFF VALVE

Filed Dec. 6, 1948

Inventor
Robert E. Meynig

Lester B. Clark
& Ray L. Smith
ATTORNEYS

Feb. 2, 1954 R. E. MEYNIG 2,667,890
HIGH AND LOW PRESSURE CUTOFF VALVE
Filed Dec. 6, 1948 2 Sheets-Sheet 2
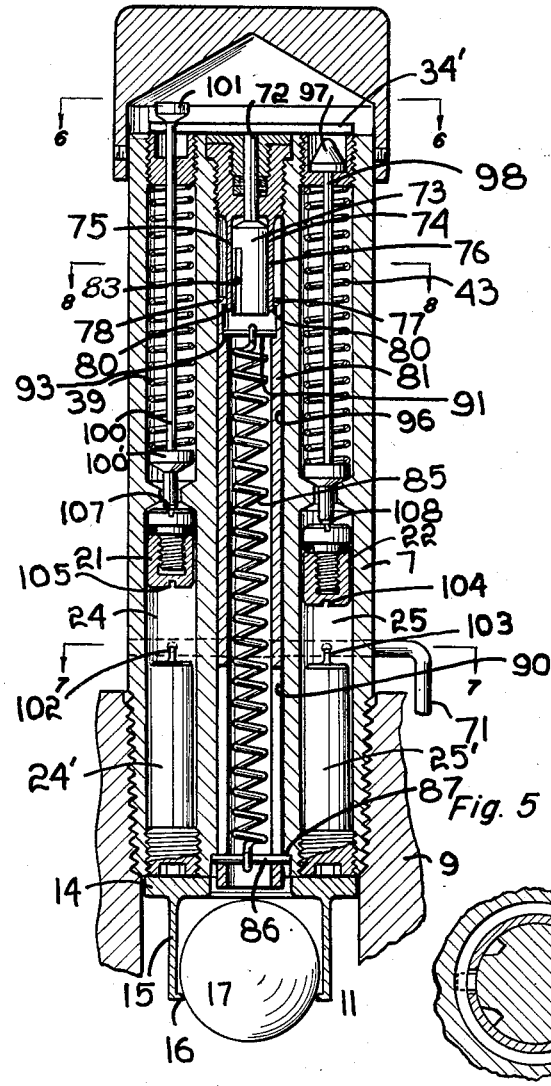
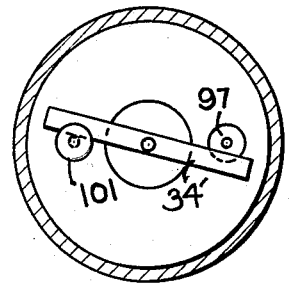
Fig. 6
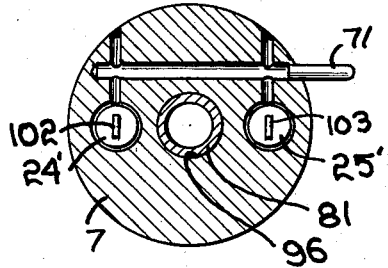
Fig. 7
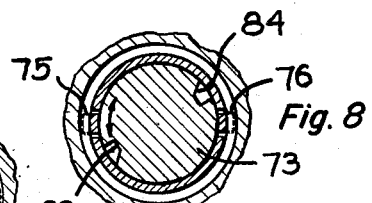
Fig. 8
Fig. 8a
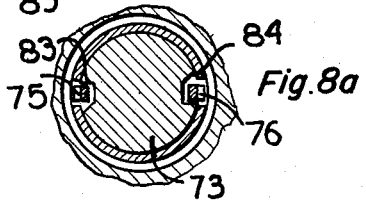
Fig. 10
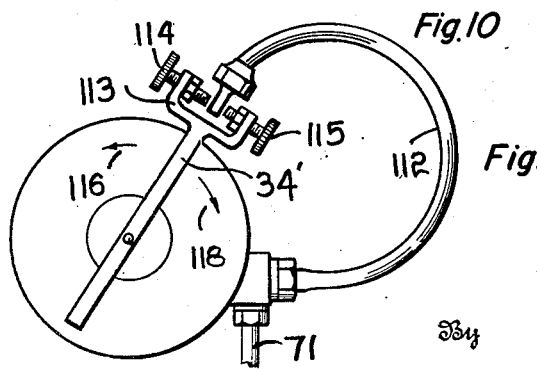
Fig. 9
Inventor
Robert E. Meynig
Lester B. Clark
& Ray L. Smith
ATTORNEYS Patented Feb. 2, 1954

2,667,890

UNITED STATES PATENT OFFICE 2,667,890

HIGH AND LOW PRESSURE CUTOFF VALVE

Robert E. Meynig, La Porte, Tex.

Application December 6, 1948, Serial No. 63,711

11 Claims. (Cl. 137—458)

The invention relates to and constitutes an improvement over my invention disclosed in co-pending application, Serial No. 715,985, filed December 13, 1946, now Patent No. 2,635,626 of April 21, 1953, for an invention in Safety System for Pipe Lines.

An object of the present invention is to provide a valve for a flow line, which valve is operable when the flow in the line exceeds or falls below a predetermined amount of pressure to shut off flow through the line.

Another object of the invention is to provide a valve for a flow line which is adapted to shut off the flow through the line as an indication that the pressure in the line is above or below the normal pressure maintained in the flow line.

Another object of the invention is to provide in a valve adapted to be positioned in a flow line, which valve is operable when the pressure exceeds or falls below a predetermined amount to shut off the flow through the line, means for releasably retaining the valve in open position.

Another object of the invention is to provide in a valve adapted to be positioned in a flow line, which valve is operable when the pressure exceeds or falls below a predetermined amount to shut off the flow through the line, means for releasably retaining the valve in open position, and additional means for moving the valve to closed position in the flow line to shut off flow in the line when the pressure therein exceeds or falls below said predetermined amount.

Another object of the invention is to provide in a valve adapted to be positioned in a flow line, which valve is operable when the pressure exceeds or falls below a predetermined amount to shut off the flow through the line, means for releasably retaining the valve in open position, means for moving the valve to close position in the flow line to shut off flow in the line when the pressure therein exceeds or falls below said predetermined amount, and means for engaging said valve to reseat it in the releasable retaining means when normal pressure is reestablished in the flow line.

Still another object of the invention is to provide a valve to be positioned in a flow line, which valve is operable to shut off the flow in the line when the pressure therein exceeds a predetermined amount.

Still a further object of the invention is to provide a valve for a flow line, which valve is operable when the pressure falls below a predetermined amount to shut off flow through the line.

Yet a further object of the invention is to provide a valve for a flow line, which valve is provided with means for retaining the valve in open position so long as the pressure in the flow line falls within a predetermined range.

A further object of the invention is to provide a valve for a flow line, which valve is provided with means for retaining the valve in open position so long as the pressure in the flow line falls within a predetermined range and by a means associated with the valve for actuating it when the pressure in the flow line varies from said predetermined range.

Other and further objects and advantages of the invention will become more readily apparent from a consideration of the following description and drawings, wherein:

Fig. 5 is an enlarged vertical sectional view of an alternative embodiment of the invention;

Fig. 6 is a sectional view taken on the line 6—6 of Fig. 5;

Fig. 7 is a sectional view taken on line 7—7 of Fig. 5;

Fig. 8 is a sectional view taken on the line 8—8 of Fig. 1;

Fig. 8A is the same view of Fig. 8, but shows the relation of the component parts when in closing position;

Fig. 9 is a top plan view illustrating another embodiment of the invention, and

Fig. 10 is the sectional view of the embodiment illustrated in Fig. 9, showing the arrangements of the parts therein.

Figure 1:
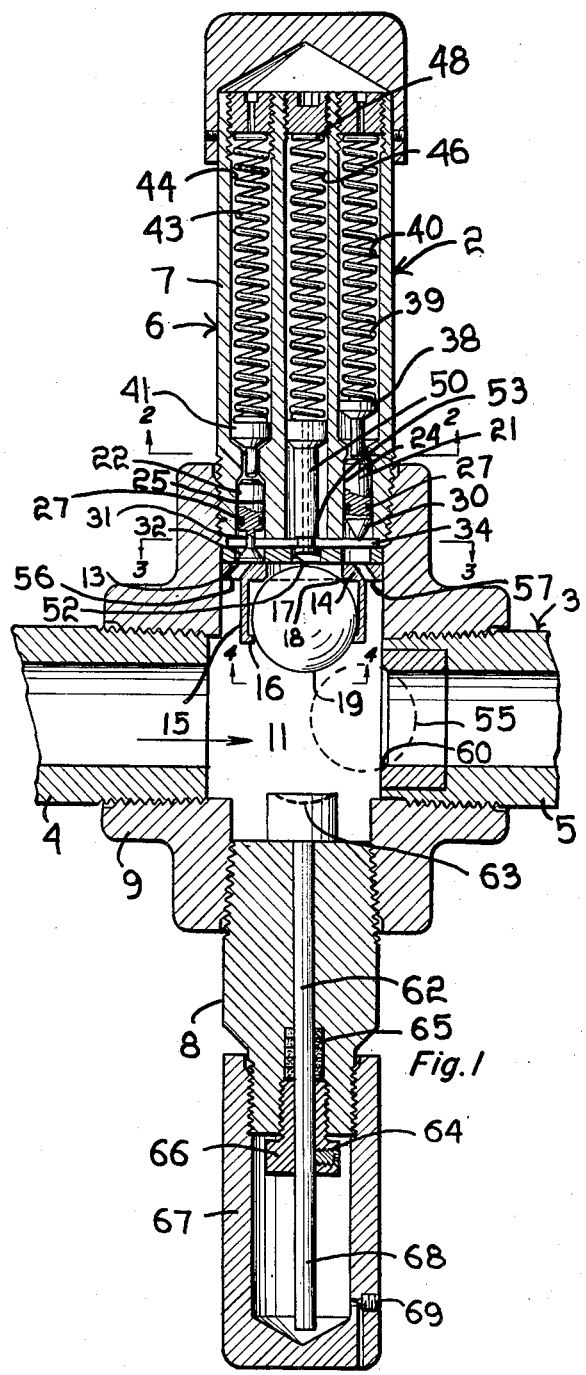
Fig. 1 is a vertical sectional view of an embodiment of the invention showing it positioned in a flow line.
Figure 2:
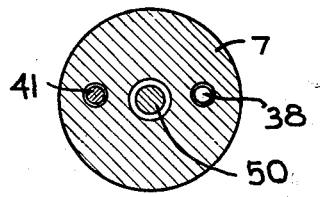
Fig. 2 is a sectional view on the line 2—2 of Fig. 1, illustrating an arrangement of the component parts of the embodiment shown in Fig. 1.

In Fig. 1 the device is shown generally at 2 and as being connected in a flow line 3, and having successive pipe sections 4 and 5 which are respectively on the upstream and downstream sides of the valve. The coupling 9 of the device 2 innerconnects the sections 4 and 5. The form of the invention illustrated in Fig. 1 is adapted to be positioned on the downstream side of the flow choke which is connected into the flow line leading from the well head of an oil or gas well. The pressures encountered downstream from the choke are smaller than those encountered upstream of the choke, and the embodiment illustrated in Fig. 1 is constructed to operate on flow lines where the pressure therein is not excessive. It seems obvious, of course, that while the invention is disclosed as applying particularly and as being readily adaptable to the flow lines of gas and oil wells, the invention may be readily inserted in any flow line in which it is desired to regulate the pressure range within the line.

The body 6 comprises the portion 7, which is adapted to receive the valve and its operating and control mechanism and the portion 8 in which is arranged the valve reseating mechanism.

The two portions, 7 and 8 are secured in the four-way coupling 9 into which the sections 4 and 5 are also engaged. The portions 7 and 8, and the coupling 9, comprise the body 6 of the device and the arrangement of each of such portions in the coupling 9 is such that a passage 11 is formed therein which intersects the line of flow between the two pipe connections 4 and 5 in the flow line denoted generally at 3.

Arranged on the inner-end 13 of the portion 7 is a ring 14 which has downwardly extending fingers 15 thereon. The fingers 15 are tapered inwardly and are provided at their lower ends with flanges 16. The fingers 15 are formed of spring like material so that when the ball valve 17 is positioned in the seat 18 on the ring 14, the flanges 16 will resiliently engage the outer surface 19 of the ball valve so as to retain the valve sidewardly to the line of flow in the flow line 3. The ring 14 may be secured to portion 7 by suitable means such as screws as shown at 70 in Fig. 4.

Disposed above the ring 14 are pistons 21 and 22 arranged in the chambers 24 and 25, respectively of the portion 7 of the body 6. Suitable seal means, such as the seal rings 27, are provided on each piston to contact the walls of chambers or cylinders 24 and 25.

Figure 3:
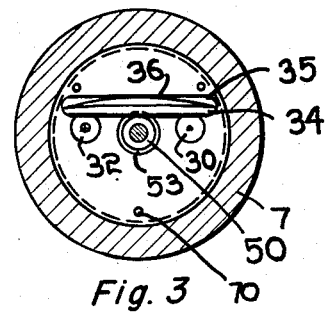
Fig. 3 is a sectional view on the line 3—3 of Fig. 1.

It is to be noted that the downwardly facing surface 30 of the piston 21 is provided with an annular tapered end as shown in Fig. 1 of the drawing, while the bottom portion of the piston 22 has a stem 31 with an upwardly tapered footing 32 connected thereto. As shown in Fig. 3, a bar 34 extends laterally of the portion 7 and is arranged adjacent the footing 32 of piston 22 and the annular tapered end 30 of the piston 21. The bar 34 is mounted in a slot 35 which has a leaf spring 36 therein resiliently contacting the bar for a purpose more fully described hereinafter.

Arranged above the piston 21 is a plunger 38 contacting the spring 39 in the chamber 40. Similarly, a plunger 41 is provided above the piston 22 with a spring 43 arranged thereabove in the chamber 44. Also arranged in the portion 7 of the housing 6 is an additional chamber 46 with the spring 48 therein. The spring 48 is under compression and contacts the plunger or stem 50 thereby tending to move the plunger 50 downwardly. The end of the plunger 50 extends through the opening 52 which is a continuation of the opening 46 but is slightly smaller in diameter, and as seen from the drawing, the opening 52 communicates with the passage 11 in the body of the device 2.

Adjacent the lower end of plunger 50 is an annular groove 53 of a size to receive the bar 34. The bar 34 is designed to restrain the plunger from moving downwardly and engaging the ball valve 17 and moving it into the passage 11 as indicated in dotted lines at 55, to shut off flow between the pipe connections 4 and 5 in the flow line 3. In order to displace the bar 34 from the annular groove 53 on the plunger 50, whereby such plunger may be moved downwardly by the compression spring 48, passages 56 and 57 are provided through the ring 14 and communicate with the chambers 23 and 24 thereby subjecting each of the pistons 21 and 22 to the pressure in the flow line 3.

The spring 43 may be of a predetermined strength so that it retains the piston 22 in a downwardly position as illustrated in Fig. 1. If the pressure in the flow line exceeds the predetermined compression of the spring 43, the piston 22 will be moved upwardly in the chamber 25 whereby the tapered footing 32 engages the side of bar 34 and moves it sidewardly in the groove 53. This is more clearly illustrated in Fig. 3, wherein the bar 34 is shown as being resiliently retained in the annular groove 53 by the leaf spring 36.

As soon as the tapered footing 32 is moved upwardly enough so as to release the bar 34 from engagement with the plunger 50, such plunger moves downwardly to contact the ball valve 17 and move it into line of flow through the flow line 3. When this occurs, the stream passing through the flow line will move the ball valve 17 to the position as indicated at 55 in dotted lines. If desired, a seat 60 may be provided in the flow line 3 to receive the valve 17.

Similarly, the spring 39 may be of a predetermined compression so that when the fluid pressure exerted through passage 57 and into the chamber 24 and acting upon the plunger 21 falls below a predetermined amount, the spring 39 will move the piston 21 downwardly whereby the annular tapered end 30 contacts the side of bar 34 and moves it sidewardly of slot 35 to disengage the bar from the groove 53 in the plunger 50, whereupon the plunger moves the ball valve 17 into the passage 11 and on to the seat 60 to shut off flow through the line.

Therefore, from the foregoing, it is readily seen that a device is provided which is operable when the pressure exceeds or falls below a predetermined amount in a flow line to shut off the flow through the line. The flow through the line may then be cut off manually and the condition cleared which causes the abnormal or subnormal pressure in the line.

In order to put the valve in operable position and to reengage the valve 17 in its normal position sidewardly of the flow line 3, there is provided in the portion 8 of the body 6 a plunger 62 which has a seat 63 on the inner end thereof adapted to engage the valve 17. The plunger 62, seat 63 and engaged valve may be moved upwardly until the valve reseats in the fingers 15, which recocks the center plunger 50. If necessary, the ball valve may be located in seated position by securing the set screw 64 against the plunger 62. Suitable packing 65 and a stuffing box 66 are provided around the plunger 62 to inhibit the leakage of fluid from around the stem 63 or plunger 62. A cap 67 may be provided to protect the extended end 68 of the plunger 62. A bleed valve 69 is provided in the cap 67 to bleed excessive pressures from within the cap before removing it to expose the extended end 68 of stem 62.

The embodiment illustrated in Fig. 5 is similar to that shown in Fig. 1 but is adapted to be positioned on the upstream side of a flow choke between the well head and the choke. It may at times be desirable to shut off the flow of fluids from an oil or gas well as close to the well head as possible and to that end the embodiment illustrated in Fig. 5 is provided.

While the embodiment illustrated in Fig. 5 is described as applying particularly to high pressures in the flow line of an oil or gas well, it seems obvious that the device could be as readily used in any high pressure flow line.

The portion 8 of the valve body 6 has been omitted from the drawing in Fig. 5 as has the showing of the successive flow line pipe connectors 4 and 5. However, it is to be understood that the embodiment shown in Fig. 5 can be positioned in a flow line in the manner illustrated in Fig. 1.

The portion 7 of the embodiment shown in Fig. 5 is provided at its inner-end with a ring 14 similar to the ring shown in Fig. 1, and downwardly extending fingers 15 are provided with flanges 16 thereon to resiliently engage and retain the valve 17 in its normal seating position in the fingers.

Figure 4:
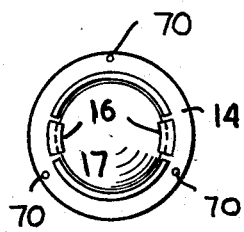
Fig. 4 is an elevation view taken on the line 4—4 of Fig. 1.

The ring 14 may be secured to the portion 7 by any suitable means such as screws as shown at 70 in Fig. 4. Chambers or cylinders 24 and 25 are provided in the portion 7 to receive pistons 21 and 22. The lower portion of the chambers 24 and 25 are filled with the plugs 24' and 25' to prevent the entry of fluid from the passage 11 through the body 6 adjacent the valve 17.

In view of the fact that the modification of the invention shown in the Fig. 5 is adapted to be positioned on the high pressure side or on the upstream side of the choke, the plugs 24' and 25' are necessary to keep the high pressure fluid of the flow line from entering the chambers 24 and 25. It is not uncommon for the pressure on the upstream side of a flow choke to range from 4,000 to 10,000 pounds per square inch and it seems obvious that it would be impossible as a practical matter, to provide a device which would operate in response to such pressure. Therefore, a flow line 71 may be connected on the downstream side of the flow choke where the pressures are greatly reduced to conduct the medium passing through the flow line 3 into the chambers 24 and 25 to exert a force against the pistons 21 and 22.

At the top of the portion 8 of the embodiment shown in Fig. 5, a bar 34' extends laterally of such portion and is secured to a stem 72, which is, in turn, connected to the plug 73. The plug 73 fits within a sleeve 74, which sleeve is provided with two fingers 75 and 76 formed integrally therewith and extending downwardly therewith. The fingers 75 and 76 are provided at their lower ends with flanges 77 and 78, respectively. Adapted to rest on the flanges 77 and 78 is the annular shoulder 80 at the top of the plunger 81. The fingers 75 and 76 are formed of spring material and tend to exert an inward pressure against the surface of plug 73. In order to release the plunger 81, longitudinal grooves 83 and 84 are provided in the surface of plug 73 so that when the plug is rotated, the fingers 75 and 76 will move inwardly as illustrated in Fig. 8A whereupon the flanges 77 and 78 disengage from the shoulder 80 so as to permit downward movement of the plunger 81. The plunger 81 is provided with a spring 85 therein, which is retained under tension by being connected with the pin 86 secured in the shoulder 87 of the portion 8. A longitudinal slot 90 in the plunger 81 permits the plunger to move downwardly over the pin 86 to engage and release the valve 17 from its seated position in the ring 14. A pin 91 engages the upper end of the tension spring 85 which is secured in position on the shoulder 93 of the plunger 81.

From the foregoing, it seems obvious that when the plug 73 is rotated so that the grooves 83 and 84 thereon coincide with the fingers 75 and 76 on the sleeve 74, such fingers will spring inwardly into the groove thereby releasing their engagement with the shoulder 80 on the plunger 81. Since the tension spring is pinned at the top of the plunger and at its bottom to the portion 7, it snaps the plunger downwardly in the bore 96 to engage and release the valve 17.

In order to rotate the bar 34' and connected plug 73 to release the plunger 81, means are provided which are similar to that shown in Fig. 1. Since the conduit 71 is connected downstream of the flow choke, the pistons 21 and 22 are subjected to the flow line pressure on the downstream side of the choke. As such pressure becomes excessive, piston 22 will be moved upwardly against the force of the spring 43 causing the cone shaped end 97 of the stem 98 to move against the side of the bar 34'. This is more clearly illustrated in Fig. 6, and from Fig 6 it can be seen that as the cone shaped end 97 of the stem 98 moves against the bar 34', it will move the bar in a clockwise direction thereby effecting alignment of the longitudinal grooves 83 and 84 with the fingers 75 and 76 so as to release the plunger 81.

Similarly, if the pressure in the chamber below piston 21, which is substantially equal to the pressure in flow line 3, falls below the compression in spring 39, the piston 21 will move downwardly whereupon stem 100 moves downwardly contacting the tapered footing 101 against the bar 34'. This rotates the bar 34' and plug 73 so as to align the grooves therein with the fingers 75 and 76 to release the plunger 81.

From the foregoing, it seems obvious that a device is provided which is operable to shut off flow in a line when the pressure therein exceeds or falls below a predetermined amount.

The tops of the blocks 24' and 25' are provided with a screw-driver point 102 and 103, respectively, which are adapted to engage in the grooves 104 and 105 in the bottom of the pistons 21 and 22. Similarly, grooves 107 and 108 may be provided in the top of the pistons 21 and 22 so that a screw-driver may be engaged in the grooves 107 and 108 to move the pistons 21 and 22 downwardly into engagement with the points 102 and 103. The ring 14 may be removed from the inner-end of portion 7 by removing the screws 70, and thereafter the plugs 24' and 25' may be unscrewed and removed from the chambers 24 and 25. The device may then be used on the downstream side of a flow choke.

If the valve 17 has been released and the flow line cut off on the upstream side of the valve, the pressure may be bled off in the flow line 3, whereupon the ball falls upon the seat 63 of the plunger 62 in the portion 8.

The ball may then be reseated in the ring 14 by pushing the ball up and locking the plunger in place with the set screw 64. After the pressure conditions have been reestablished in the flow line, the stem 100 may be unscrewed from the connection 100' whereupon the bar 34' may be moved clockwise one-half turn so as to move the grooves 83 and 84 to disengage the fingers 75 and 76 therefrom to reposition the plug 73 in operable or cocked position. This will re-engage the flanges 77 and 78 with the shoulder 80 on the plunger 81. The stem 100 may then be reinserted in position in the connection 100'. The stem 62 may be lowered and the valve is ready to resume operation.

Another alternate embodiment of the invention is illustrated in Fig. 9, wherein the flow line 71 is shown as being connected in a Bourdon type pressure tube as illustrated at 112. The bar 34' is provided at its outer end with the yoke construction 113, which has adjustable nuts 114 and 115 provided therein.

The end of the Bourdon tube 112 is arranged to fit in the space between the ends of the adjustable screws 114 and 115 as shown in Fig. 9. As the pressure in the line 71 exceeds a predetermined value for which the Bourdon tube may be set, it will move the tube 112 so that it contacts the screw 114 moving the rod 34' in a counter-clockwise direction as indicated by the arrow 116. The movement of the rod 34' is arranged so that it will rotate a plug 73 as shown in Fig. 5, whereupon the plunger 81 is released and engages the valve 17. Similarly, as the pressure in the line 71 falls below a predetermined amount, the Bourdon's tube will contact the screw 115 and move the bar 34' in a clockwise direction as indicated by the arrow 118. This movement also affects rotation of the plug 73 as shown in Fig. 5, to release the plunger 81. Fig. 10 illustrates an arrangement and construction of the device when a Bourdon tube is used as described.

The embodiment illustrated in Fig. 9 is designed to be arranged on the top of the embodiment as shown in Fig. 5, with the exception, of course, that the high and low pressure operable plunger and springs will be dispensed with and movement of the bar 34' will be effected by movement of the Bourdon's tube 112.

Broadly, the invention contemplates a device for regulating the flow in a line.

What is claimed is:

1. A valve for a flow line, which valve is operable when the pressure in the flow line varies a predetermined amount to shut off flow through the line comprising a housing, a valve therein, a valve seat across a passage through said housing, a member releasably retaining said valve sidewardly of said flow line passage adjacent said seat, means to positively force said valve from said member into the line of flow, latch means to retain said forcing means in cocked position ready to move said valve, and latch release means operable by fluid pressure to release said latching means whereby said valve is moved into the flow line passage, and additional means operable from the outside of said housing for engaging said valve to reseat it in said releasable retaining means.

2. A valve for flow lines, comprising, a body adapted to be connected in a flow line and having a passage therethrough, a valve seat across said passage, a valve movable into the line of flow through said passage adjacent said seat, means releasably retaining said valve in a position at one side of said passage, and plunger means operable in response to variations from a predetermined pressure in the flow line to force said valve from said retaining means into said line of flow to close said passage.

3. A valve for flow lines, comprising, a body adapted to be connected in a flow line and having a passage therethrough, a valve seat across said passage, a valve movable into the line of flow through said passage adjacent said seat, means releasably retaining said valve in a position at one side of said passage, and resiliently supported plunger means operable in response to variations from a pre-determined pressure in the flow line to force said valve from said retaining means into said line of flow to close said passage.

4. A valve for a flow line, comprising, a body adapted to be connected in the flow line and having a horizontal passage therethrough, a valve seat across said passage, a valve movable into the line of flow through said passage adjacent said seat to stop flow through said line, means to retain said valve immediately above said passage, plunger means operable when the pressure in the flow line falls below a pre-determined amount to positively force said valve from said retainer means into the line of flow to close said passage.

5. A valve for a flow line, comprising, a body adapted to be connected in the flow line and having a passage therethrough, a valve seat across said passage, a valve movable into the line of flow through said passage adjacent said seat to stop flow through said line, means to retain said valve in a position at one side of said passage to allow flow through said passage during normal flow line conditions, plunger means operable in response to variations from a pre-determined pressure in the flow line to force said valve from said release means into the line of flow to close said passage, and additional means exterior of said body for engaging said valve to reseat said valve in said retaining means to re-establish flow through said passage.

6. A valve for a flow line, comprising, a body adapted to be connected in the flow line and having a passage therethrough, a valve seat across said passage, a valve movable by gravity in the line of flow through said passage adjacent said seat to stop flow through said line, spring means to retain said valve at one side of said flow line, plunger means operable when the pressure in the flow line exceeds a pre-determined amount to force said valve from said retainer means into said line of flow to close said passage; and additional means manually operable in said body for engaging said valve to reseat it in said retaining means to reestablish flow through said passage.

7. A valve for a flow line, comprising, a body adapted to be connected in the flow line and having a passage therethrough, a valve, means to move said valve into the line of flow through said passage to stop flow through said line, means to retain said valve at one side of the flow line prior to said movement, and means operable when the pressure in the flow line falls below a pre-determined amount to release said first mentioned means to force said valve from said retaining means into the line of flow to close said passage, and additional means in said body for engaging said valve from such closed position to reseat it in said retaining means to re-establish flow through said passage.

8. A valve for a flow line, comprising, a body adapted to be connected in the flow line and having a passage therethrough, a valve movable into the line of flow through said passage to stop flow through said line, retainer means releasably retaining said valve in a position sidewardly of said passage, and separate plunger means operable in response to a pre-determined high and a pre-determined low pressure for forcing said valve from said retainer means into said passage to cause such line flow to stop.

9. A valve for a flow line, comprising, a body adapted to be connected in the flow line and having a passage therethrough, a valve movable into a passage therethrough to stop flow through said line, means releasably retaining said valve in a position sidewardly of said passage, means to force said valve from said retainer means, and separate latch means operable in response to a pre-determined high and to a pre-determined low pressure for releasing said forcing means for moving said valve into said passage to stop flow through said line, and additional means in said body for engaging said valve to reseat it in said retaining means to re-establish flow through said passage.

10. In a valve for a flow line, which valve is operable when the pressure in the flow line exceeds or falls below a pre-determined amount to shut off flow through the line, a valve body having a passage therethrough, a valve seat across said passage, a valve for said seat, a retaining seat releasably retaining said valve sidewardly of said flow line through said passage adjacent said valve seat, means comprising a plunger to force said valve off said retaining seat into the line of flow, and latching means operable by variation of the fluid pressure in the flow line to release said forcing means to move said valve into the flow line to shut off flow through said line.

11. In a valve for a flow line, which valve is operable when the pressure in the flow line exceeds or falls below a pre-determined amount to shut off flow through the line, a valve body having a passage therethrough, a valve seat across said passage, a valve for said seat, a retaining seat releasably retaining said valve sidewardly of said flow line through said passage adjacent said valve seat, means including a cocked spring and plunger to force said valve off said retaining seat into said flow line, latching means to retain said forcing means in cocked position ready to move said valve, and additional and separate means operable one by high and one by low fluid pressure to release said latching means whereby said forcing means moves said valve into the flow line, and the flow line pressure is blocked by said valve.

ROBERT E. MEYNIG.

References Cited in the file of this patent

UNITED STATES PATENTS

| Number | Name | Date |
|---|---|---|
| 513,902 | Elcoate | Jan. 30, 1894 |
| 524,393 | Neely | Aug. 14, 1894 |
| 693,133 | Hennebohle | Feb. 11, 1902 |
| 819,492 | Wylie | May 1, 1906 |
| 943,559 | Miller | Dec. 14, 1909 |
| 1,093,899 | Waddell | Apr. 21, 1914 |
| 2,024,042 | Jance | Dec. 10, 1935 |
| 2,327,055 | McMahon | Aug. 17, 1943 |
| 2,635,626 | Meynig | Apr. 21, 1953 |

OTHER REFERENCES

Oil Weekly, April 22, 1946, advertisement by Derneal Co.